United States Patent

Parker et al.

[15] 3,642,089
[45] Feb. 15, 1972

[54] MARINE IMPLODER-TYPE ACOUSTIC IMPULSE GENERATOR

[72] Inventors: Marion L. Parker; Hillman Southwick, both of Houston, Tex.

[73] Assignee: Western Geophysical Company of America, Houston, Tex.

[22] Filed: July 23, 1969

[21] Appl. No.: 844,011

[52] U.S. Cl. .................. 181/0.5 R, 181/0.5 H, 181/0.5 AG, 340/12, 340/17
[51] Int. Cl. .......................................................... G01v 1/00
[58] Field of Search ................ 116/137 R, 137 A; 181/0.5 H; 340/7, 8

[56] References Cited

UNITED STATES PATENTS 3,369,627   2/1968   Schempf ................................. 181/.5

Primary Examiner—Richard A. Farley
Assistant Examiner—H. A. Birmiel
Attorney—Michael P. Breston, Alan C. Rose and Alfred B. Levine

[57] ABSTRACT

An acoustic impulse generator for producing in a liquid body acoustic impulses useful, for example, in geophysical explorations. The generator includes a housing which defines an enclosed chamber having a movable slidably mounted piston. Fluid-operated driving means including fluid spring means in one operating condition cause the piston to execute a forward stroke in the liquid body thereby storing potential energy in the liquid body and in the fluid spring means. The driving means in another operating condition allow the piston to execute a return stroke in a relatively short time interval thereby generating an acoustic impulse.

11 Claims, 3 Drawing Figures

PATENTED FEB 15 1972          3,642,089

Marion L. Parker
Hillman Southwick
INVENTORS

BY   Michael P. Breston

ATTORNEY

3,642,089

MARINE IMPLODER-TYPE ACOUSTIC IMPULSE GENERATOR

BACKGROUND OF THE INVENTION

Acoustic impulse generators for producing in a liquid acoustic impulses are known in the art. U.S. Pat. No. 3,369,627 shows two adjacently positioned circular plates towed in sea water. Driving means cause the lower plate to execute a forward stroke relative to the upper plate in a relatively short time interval thereby creating a cavity between the plates. The violent collapse of this cavity by the surrounding water generates an acoustic impulse which propagates throughout the body of water. Subsequent to the generation of the acoustic impulse, the driving means cause the lower plate to execute a relatively slow return stroke.

In such a generator, the power required to execute a very fast forward stroke against the ambient water pressure is very great. Such generators, therefore, require relatively large, high-power actuators. Moreover, since the bottom plate which executes the forward stroke is completely exposed to the open water at the time when the surrounding water rushes in to collapse the cavity, both plates rapidly experience structural fatigue.

U.S. Pat. No. 3,277,437 shows another type of acoustic generator submerged in a body of water which includes an enclosed chamber having a movable piston. Under the influence of a fluid-pressure-and-vacuum source the piston executes a forward stroke. The piston is then permitted to execute a return stroke thereby converting potential energy, stored in the liquid body during the forward stroke, into kinetic energy which makes available energy for the formation of an acoustic shock wave when the piston comes to rest. In this type of generator the acceleration of the piston during the return stroke is relatively limited.

SUMMARY OF THE INVENTION

In accordance with this invention there is provided a generator for generating high-power acoustic impulses when submerged in a liquid body. The generator comprises a housing which defines an enclosed chamber having a movable piston. Fluid-operated driving means including fluid spring means are coupled to the piston to cause the piston to execute a forward stroke in the liquid body. During the forward stroke of the piston, potential energy is stored both in the ambient liquid body and in the fluid spring means. The forward stroke may be relatively slow. The combined potential energy stored in the fluid spring means and in the liquid body is released upon command to cause the piston to execute a return stroke in a relatively short time interval. The greater the potential energy stored in the spring means, the greater will be the acceleration of the piston during the return stroke. Consequently, the piston can be made to move away from the liquid body into the enclosed chamber as fast as or faster than the liquid body can follow the piston. If the potential energy stored in the spring means is sufficiently great, a cavity will then be formed between the piston and the surrounding liquid body. The surrounding liquid rushes in to fill this cavity, and in so doing a relatively high-power acoustic impulse becomes generated and propagated throughout the liquid body.

If the potential energy stored in the spring means is not sufficiently great as to cause the formation of a cavity, then the piston will return only as fast as the liquid can follow it, and the acoustic impulse will become generated when the piston abruptly comes to rest.

Figure 1:
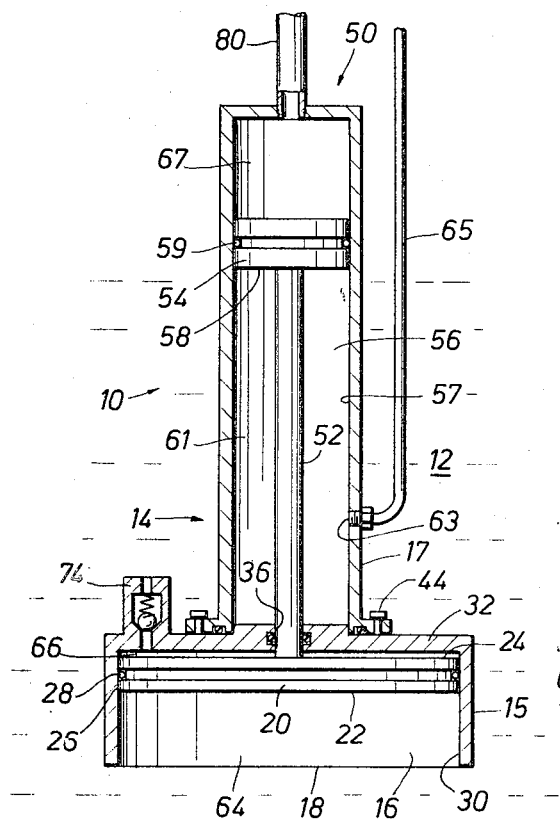
FIG. 1 is a cross-sectional view of an acoustic impulse generator embodying the principles of this invention and showing the piston at its rest position.

Referring to the drawings, an acoustic impulse generator, generally designated as 10, is shown submerged in a liquid medium such as sea or ocean water 12. Generator 10 can be completely or partially submerged in the water body 12 to a given depth below the air/water interface. This depth will be referred to as the operating depth characterized by an operating ambient pressure.

Generator 10 includes a housing 14 which, for convenience of construction, is made of two cylindrical sections 15 and 17. Section 15 defines an inner bore 16 also of cylindrical configuration. Bore 16 is opened at one end 18 to the water medium 12. A piston 20 is slidably and sealingly mounted in bore 16. Piston 20 has an outer face 22 and an inner face 24. On the cylindrical outer wall 26 of piston 20 is provided a suitable sliding seal 28 to assure a sealing relationship between the outer cylindrical wall 26 of piston 20 and the inner cylindrical wall 30 of section 15.

Figure 2:
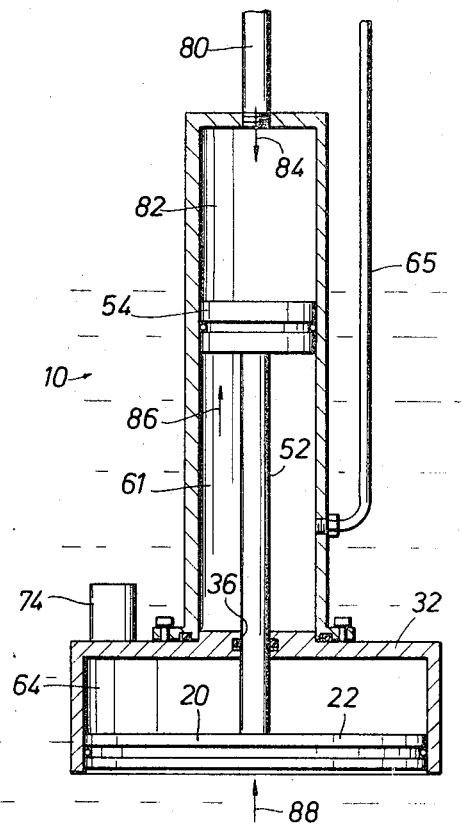
FIG. 2 shows the generator in its cocked position.

Piston 20 is adapted to execute a forward stroke from its rest position, as shown in FIG. 1, to its cocked position as shown in FIG. 2 and, upon "firing" generator 10, to return very rapidly from its cocked position to its rest position. In the rest position the inner face 24 of piston 20 rests against end wall 32 which has a cylindrical opening 36. Section 17 is fixedly attached to wall 32 as by bolts 44.

To cause piston 20 to execute its strokes, there is provided a driving system generally designated as 50, which includes an actuating member such as a push rod 52 attached at one end to piston 20 through opening 36. The other end of push rod 52 is provided with a piston 54 slidably mounted in bore 57 on seal ring 59. Rod 52 is spring-loaded by suitable spring means such as an air spring 56 between lower face 58 of piston 54 and wall 32.

As thus far described, bore 16 is divided into a chamber 64 between outer face 22 of piston 20 and the open end 18, and a chamber 66 between inner face 24 of piston 20 and wall 32. Bore 57 is divided into a chamber 61, containing air pressure admitted through an inlet port 63 from a regulated, controllable air pressure source (not shown) through a conduit 65, and a chamber 67 admitting high-pressure fluid. To prevent back pressure on inner face 24 of piston 20, there is provided communication between chamber 66 and the water medium through a check valve 74.

Rod 52 may be pushed downwardly, against the resistance offered by air spring 56 and the operating ambient pressure, by a suitable fluid pressure 82 on line 80 coupled on one hand to chamber 67 and on the other hand to a fluid pressure source (not shown). The fluid pressure 82 in chamber 67 exerts a downwardly directed force, designated by arrow 84, against piston 54. The required force 84 is greater than the sum of the upwardly directed spring resistance force 86 and the upwardly directed force 88 produced by the ambient operating pressure in the water medium 12.

The displacement of piston 20 from its rest position to its cocked position may take place over a relatively long time period as compared to the duration of the acoustic impulse generated during the return stroke. To "fire" the acoustic impulse generator 10, the fluid pressure 82 is rapidly removed, as by rapidly coupling line 80 to a low pressure source (not shown).

The operation of the embodiment of the acoustic impulse generator 10 shown in FIG. 1 will be described in connection with geophysical or seismic exploration where high-power, short-duration impulses are desired. For seismic use, generator 10 would normally be attached to a towed platform and would be cyclically operated to produce a train of acoustic or seismic impulses into the water medium 12. The open end 18 of bore 16 is positioned at a given operating depth below the air/water interface.

One complete cycle of operation will be described by starting with generator 10 in its loaded ready to "fire" condition. In that condition: piston 20 is in its cocked position as shown in FIG. 2. Following the fire command signal provided by the seismic equipment on board the seismic boat, the fluid pressure 82 is removed or very greatly reduced as compared to the other forces involved. The characteristic parameters of air spring 56 can be selected so that the upwardly directed force 86 is much greater than, equal to, or less than force 88 produced by the ambient pressure of the water medium 12 against the outer face 22 of piston 20. As a consequence, the velocity of push rod 52 can be controlled. The lifting of push rod 52 causes piston 20 to execute its return stroke from its cocked position to its rest position. Thus the potential energy stored in spring 56 by push rod 52 during the downward stroke is restored by spring 56 to push rod 52 during the upward stroke.

The velocity and acceleration of a given piston 20 during the return stroke are determined primarily by the characteristic parameters of spring 56. The volume of the column of water displaced during the downward stroke of piston 20 from chamber 64 is determined by the product of the area of face 22 of piston 20 and of the length of the stroke. On the other hand, the potential energy stored in the displaced water column is proportional to the product of the ambient pressure in the water medium 12 at the open end 18 and the volume of the displaced water column.

Since piston 20 can execute its return stroke in a sufficiently short time period, piston 20 can be made to move away from the surrounding water medium 12 faster than the ambient water can enter through the open end 18 into chamber 64. Consequently, a cavity can be formed in chamber 64. The potential energy stored in the displaced column of water is now available to collapse violently this cavity and to produce a relatively high-power acoustic impulse which will become propagated throughout the water medium 12. This acoustic impulse will be reflected from the earth formations lying below the water medium. The recording and processing of the reflected signals from the underlying earth formations allow the geologist to study these formations.

If the return stroke of piston 20 is not accomplished in a sufficiently short time interval, the surrounding water will remain in contact with piston 20, and some of the kinetic energy of the water moving into chamber 64 following piston 20 will be converted into an acoustic impulse when piston 20 will abruptly come to rest.

To move piston 20 from its rest position to its cocked position, the fluid pressure 82 is applied to chamber 67 and hence to head 54. Piston 20 will then execute its forward stroke in a time interval which may be relatively long compared to the time interval of the return stroke. The fluid pressure 82 thus causes potential energy to become stored during the forward stroke both in the fluid spring means 56 and in the water column displaced from chamber 64. This completes one full cycle of operation.

The fluid line 65 provides the amount of required fluid to fluid spring means 56 from a fluid source not shown. By adjusting the fluid pressure in chamber 61, the characteristic parameters of spring means 56 can be controlled, and hence the acceleration of piston 20 can be controlled.

The fluid lines 80 and 65 can be connected to a suitable fluid-pressure and vacuum source (not shown) typically on board of the seismic boat. Such a source forms no part of this invention.

In practice generator 10 is operated repetitively to produce in the water body 12 a train of acoustic impulses which become reflected from the earth formations lying below the water medium. The recording and processing of the reflected signals from the underlying earth formations allow the geologist to study these formations.

Figure 3:
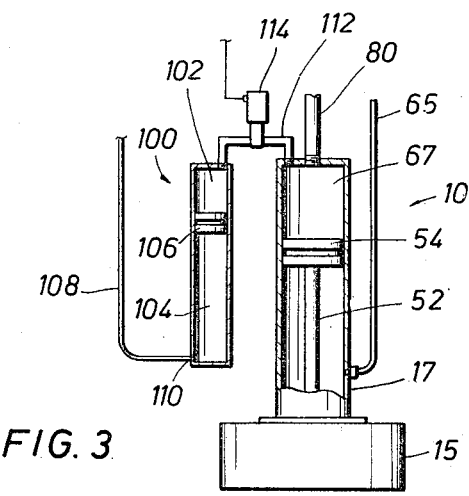
FIG. 3 shows a modified embodiment.

To allow for a faster evacuation of the fluid in chamber 67, there is shown in FIG. 3 a modified embodiment which includes an accumulator or receiver 100. Accumulator 100 defines two chambers 102 and 104 separated by a slidably mounted piston 106. The pressure in chamber 104 is controlled by a pressure line 108 coupled to an inlet 110. Pressure line 108 may be connected to said fluid pressure and vacuum source for the purpose of controllably supplying fluid pressure to and removing fluid pressure from chamber 104. Chamber 102 is coupled to the upper chamber 67 of generator 10 through a conduit 112 the fluid passage through which is controlled by a solenoid-operated valve 114.

In the operation of the modified embodiment shown in FIG. 3, during the forward stroke of piston 20 valve 114 is open; fluid pressure is applied to chamber 104 thereby forcing the fluid out from chamber 102 into chamber 67. When piston 20 reaches its cocked position under the influence of the fluid pressure from line 80, valve 114 is closed and through line 108 chamber 104 is evacuated to cause piston 106 to slide downwardly thereby creating a vacuum in chamber 102.

During the return stroke of piston 120 valve 114 is open to allow some of the fluid pressure from chamber 67 to flow out through conduit 112 into vacuum chamber 102. Of course, most of the fluid pressure from chamber 67 will be removed through line 80 in a manner previously described.

While this invention has been described in connection with illustrative embodiments it will be apparent to those skilled in the art that various modifications thereof may be made and all such modifications are intended to be covered by the claims appended hereto.

What we claim is:

1. A generator for generating a high-power acoustic impulse when submerged in a liquid body, said generator being adapted to store potential energy, said generator comprising:

housing means defining a first bore having therein a slidably mounted piston; in sliding contact with said housing fluid-driving means including fluid spring means adapted to move said piston, said driving means in one operating condition causing said slidably-mounted piston to execute a forward stroke in said liquid body thereby storing potential energy in said liquid body and in said fluid spring means, and said driving means in another operating condition allowing said piston to execute a return stroke in a relatively short time interval thereby generating said acoustic impulse.

2. The generator of claim 1 wherein, said time interval is sufficiently short to allow for the formation of a cavity between said piston and said liquid body, and the filling of said cavity by the surrounding liquid body generates said acoustic impulse.

3. The generator of claim 1 wherein, said housing means include a first wall, and said first bore extending from said first wall to said liquid body.

4. The generator as defined in claim 3 wherein, said driving means include a push rod, and said push rod having one end coupled to said piston and another end extending through said first wall.

5. The generator of claim 4 wherein, said fluid spring means is between said first wall and said other end of said push rod.

6. The generator of claim 5 wherein, said housing includes a second wall, a second closed bore being defined between said first and second walls, and a second piston attached to said other end of said push rod and slidably mounted in said second bore.

7. The generator of claim 6 wherein, said fluid spring means is between said first wall and said second piston.

8. The generator claim 7 wherein, a chamber is defined between said second piston and said second wall, and said chamber is adapted for fluid communication with a controllable pressure source to periodically move said push rod.

9. A relatively high-power generator for generating an acoustic seismic impulse when submerged in a liquid medium comprising:

a housing having therein a first bore and a second bore, said first bore being open at one end to said liquid medium;

a first piston slidably mounted in said first bore;

a second piston slidably mounted in said second bore;
a push rod attached between said pistons for causing said first piston to execute a forward stroke against the ambient liquid pressure;
fluid spring means reciprocatingly cooperating with said second piston,
    said spring means storing energy during said forward stroke; and
    said spring means causing said first piston to execute a very rapid return stroke thereby generating said seismic impulse.

10. The generator of claim 9 wherein,
said second bore is in fluid communication with a fluid pressure source to move said push rod.

11. The generator of claim 10 and further including,
a fluid receiver coupled to said second bore to receive fluid from said second bore during the return stroke of said first piston.

* * * * *